Nov. 17, 1953   H. L. GIBSON   2,659,564
NUT WEIGHING AND BAGGING APPARATUS
Filed Aug. 15, 1949   4 Sheets-Sheet 1

INVENTOR
Harry L. Gibson
BY
ATTORNEYS

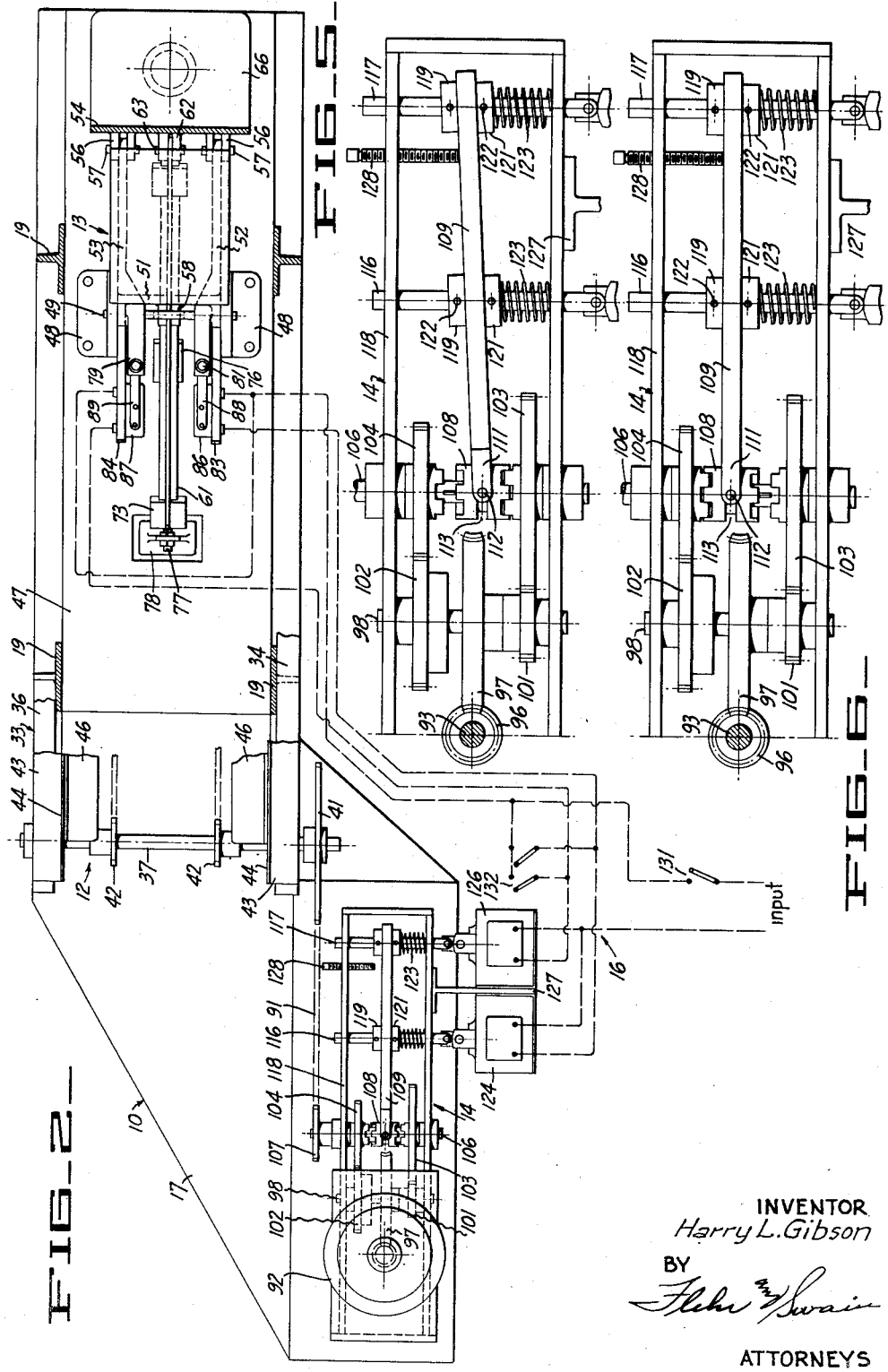

Nov. 17, 1953  H. L. GIBSON  2,659,564
NUT WEIGHING AND BAGGING APPARATUS
Filed Aug. 15, 1949  4 Sheets-Sheet 3
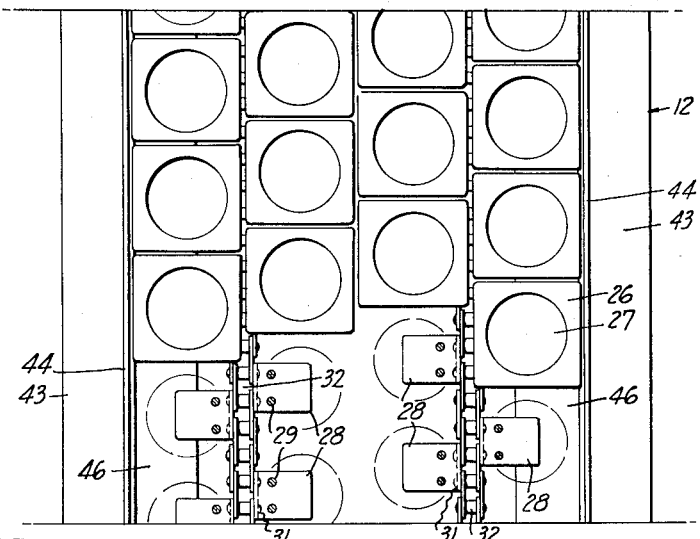
FIG_3_
FIG_4_
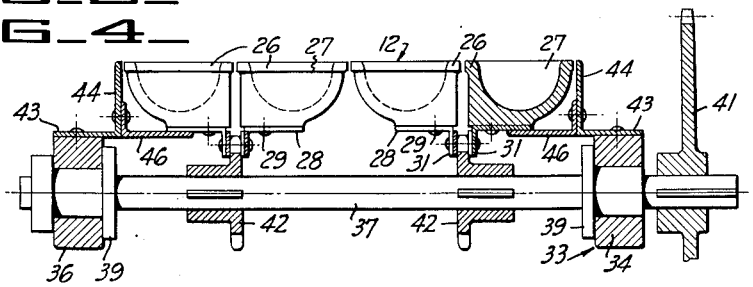
FIG_7_
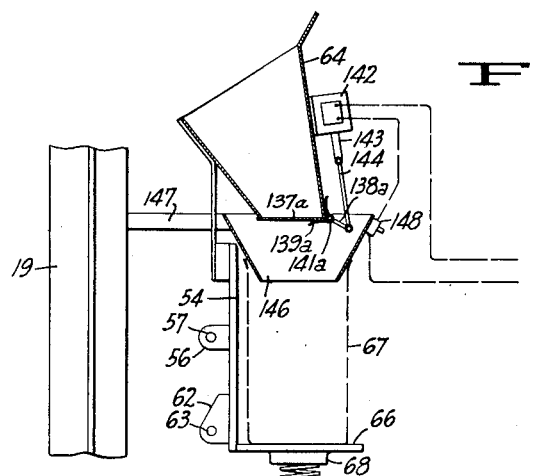
FIG_8_
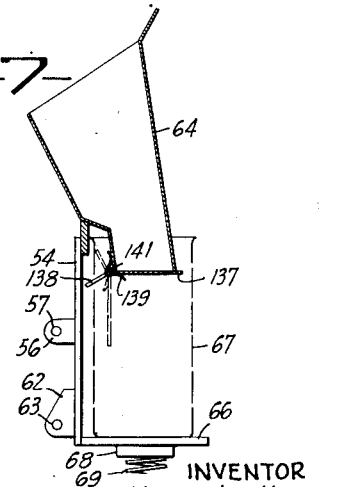
INVENTOR
Harry L. Gibson
BY
ATTORNEYS Nov. 17, 1953 H. L. GIBSON 2,659,564
NUT WEIGHING AND BAGGING APPARATUS
Filed Aug. 15, 1949 4 Sheets-Sheet 4
FIG_9_
FIG_12_
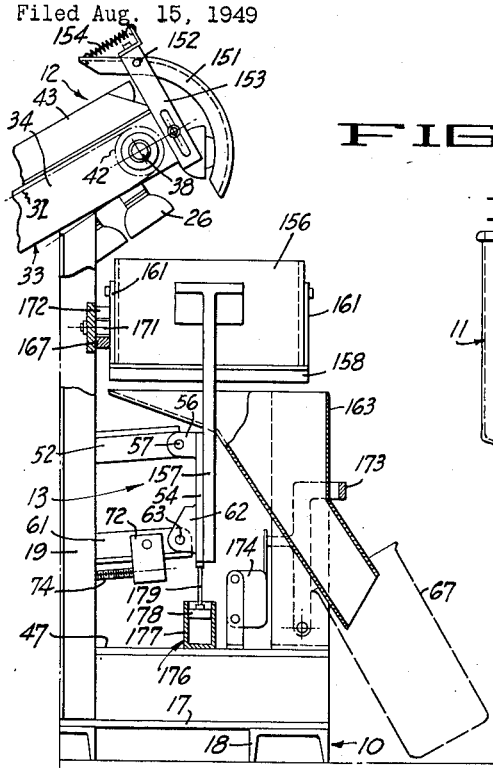
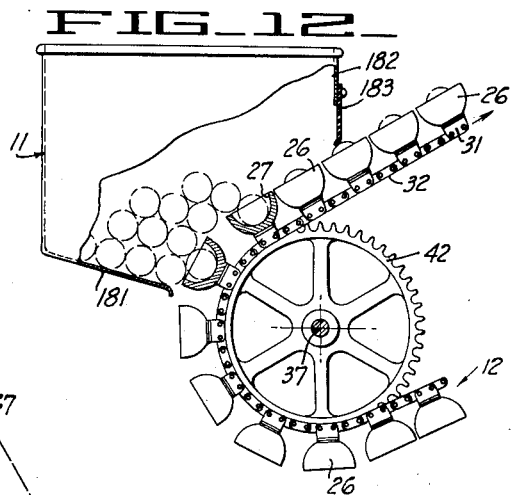
FIG_10_
FIG_11_
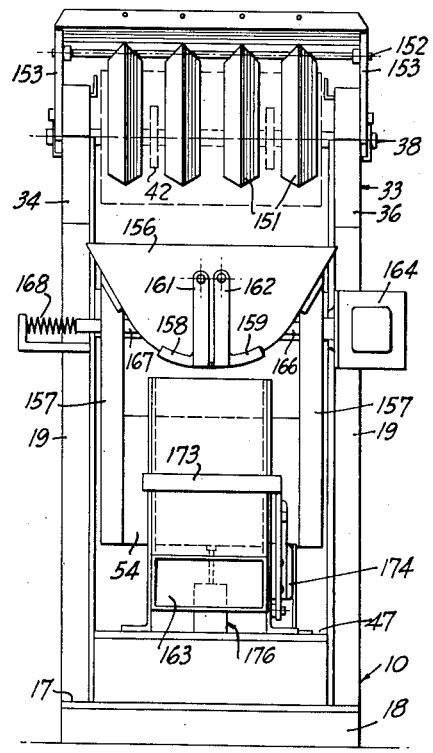
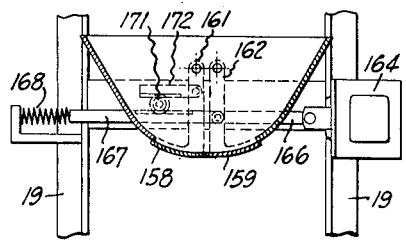
INVENTOR
Harry L. Gibson
BY
ATTORNEYS Patented Nov. 17, 1953

2,659,564

UNITED STATES PATENT OFFICE 2,659,564

NUT WEIGHING AND BAGGING APPARATUS

Harry L. Gibson, Los Angeles, Calif., assignor to Desda E. Ahlburg, Los Angeles, Calif.

Application August 15, 1949, Serial No. 110,429

1 Claim. (Cl. 249—58)

This invention relates to bagging equipment and machines and particularly to that type of equipment adaptable for use in connection with the sacking or bagging of walnuts and similar items.

In the past numerous devices of this character have been made and tested and some of them have enjoyed varying degrees of success. In the main, however, these devices are unsatisfactory for a variety of reasons. For example, some of the devices are unsatisfactory for the reason that they do not operate sufficiently accurately to obviate the necessity of a reweighing operation of each sack of material, which obviously requires the presence of additional operators. It is obvious that if a machine, whose purpose is to introduce nuts totalling a predetermined weight into a sack, is not accurate and that each sack of nuts must be reweighed, effort is being duplicated and the machine is valueless for the purpose intended.

Other devices of this character have failed because of their lack of speed. While some devices of this character may have been considered accurate within certain limits, nevertheless they have not operated with sufficient speed to render their cost and expense worth-while. It is obvious that where a large quantity of nuts are to be weighed and sacked, if the job is to be done by the use of slow machines, many such machines will be required. The purchase and maintenance of a number of these machines will be so great as to nullify any value which they may have.

Therefore, it is an object of the present invention to provide a nut bagging machine which is highly accurate.

It is another object of this invention to provide a nut bagging machine which operates with sufficient speed to render its installation in a plant profitable.

It is a further object of this invention to provide a device of this character which can be utilized in conjunction with present packing house equipment.

It is a further object of this invention to provide a device of this character which is simple to manufacture, easy to install, easy to maintain and, above all, easy to operate.

Other objects and advantages of this invention will appear from the following specification taken in conjunction with the accompanying drawings in which Figure 1 represents a side elevational view, partly in cross-section, of my device;

Figure 2 represents a generally cylindrical cross-sectional view taken along the line 2—2 of Figure 1;

Figure 3 represents a fragmentary horizontal cross-section taken along the line 3—3 of Figure 1;

Figure 4 represents a vertical cross-sectional detail taken along the line 4—4 of Figure 1;

Figure 5 is a fragmentary detail showing the speed change mechanism shown in Figure 1 in a so-called "low speed" position;

Figure 6 is a fragmentary detail showing the speed change mechanism shown in Figure 5 in a so-called "high speed" position;

Figure 7 shows a modification of the hopper arrangement illustrated in Figure 1;

Figure 8 shows a further modification of the hopper arrangement shown in Figure 7; and Figures 9, 10 and 11 show a modified form of collection hopper and discharge means; and Figure 12 illustrates a modified feed hopper.

Figure 1:
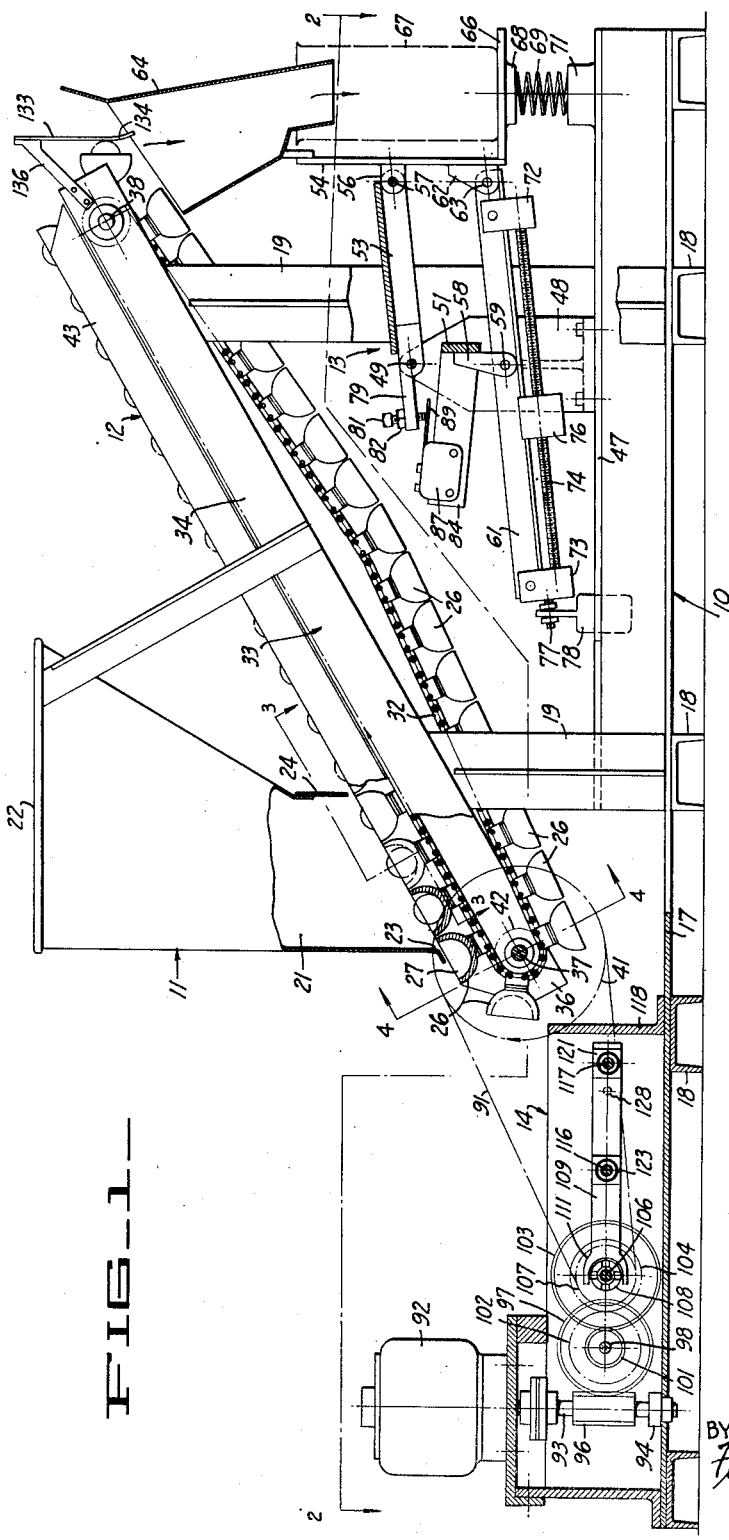

As shown in Figure 1 my device consists generally of a base 10 which supports a feed hopper 11, a conveyor 12, a weighing mechanism 13, a drive mechanism 14 and a control circuit 16.

The base 10 consists generally of a horizontal member 17 supported by a plurality of transverse channels 18, which lend rigidity to the structure, which forms a rigid base which may be secured to any desirable mounting. The base 10 is also provided with a plurality of vertical support members 19 which support the feed hopper 11, the conveyor 12 and the mechanism 13.

The feed hopper 11 consists of a chamber 21 which is adapted to hold a substantial quantity of walnuts, pecans, or other items to be weighed and sacked. These items may be fed into the hopper at its upper open end 22 in any conventional manner. The lower open end 23 of the chamber 21, as shown in Figure 1, overlies the upper surface of the upper run of the conveyor mechanism 12 in such a manner that walnuts, pecans or other items within the chamber 21 will flow downwardly through the chamber 21 onto the upper surface of the conveyor 12. In this manner the contents of the chamber 21 are continually being fed to the conveyor.

It will be noted that one upper end wall of the chamber 21 is cut away as shown in Figure 1, and in its place I have provided a yieldable wall 24 composed of rubber or other suitable material. The purpose of the resilient or yieldable wall 24 is to prevent jamming of walnuts, pecans or other items between the wall of the hopper 11 and the upper surface of the conveyor 12 as the conveyor moves to the right as shown in Figure 1.

It will be obvious from the foregoing that the feed hopper 11 may be of any desired size or shape. However, it is desirable that the lower or discharge end 23 of the same should be of the character which has previously been described, that is, that the lower or discharge end should immediately overlie the upper advancing surface of the conveyor 12 and that the walls of the hopper 11 should be designed in such a manner as to prevent jamming or wedging of the nut or other item between the hopper 11 and the conveyor 12 should one or more of the walnuts, etc. being fed to the conveyor fail properly to seat itself on the conveyor 12.

While I have indicated that the feed hopper 11 is mounted upon the base 10 and supporting members 19, nevertheless, it is obvious that the same may be supported in any other suitable manner as may be indicated by good practice when this machine is inserted in a conventional packing house operation.

The conveyor 12 is likewise mounted upon the base 10 and the vertical support members 19. Generally speaking, the conveyor 12 consists of a plurality of receiving cups 26 as shown in Figures 1, 3 and 4 which are supported and advanced in a manner presently to be described. The individual receiving cups 26 are provided with recesses 27 which are of a size to receive a walnut, pecan or other item to be weighed and sacked. Care should be taken however that the recesses 27 are of sufficient size that no more than one of the items to be weighed and sacked may be received therein and, on the other hand, that the recesses 27 are sufficiently large to receive one of said items without gripping the same. In other words, the item to be conveyed must fit loosely within the recess 27. In addition, and as shown in Figures 1 and 4, the upper surfaces of the cups 26 combine to form a relatively flat upper surface to the conveyor 12.

Each of the cups 26 is mounted upon an L-shaped bracket 28 and is secured thereto as by means of a rivet 29. The other leg of the bracket 28 is secured to one of the links 31 of one of a pair of chains 32. The entire conveyor assembly 12 is mounted upon a frame 33 which is supported by the vertical support members 19 and, as shown in Figures 1 and 2, consists generally of a pair of side rails 34 and 36. The rails 34 and 36 provide a mounting for a pair of cross-shafts 37 and 38. These cross-shafts 37 and 38 are suitably rotatably mounted within the rails 34 and 36 as by means of bushings 39. The shaft 37 is provided at one end with a sprocket 41 which is secured to the shaft in such a manner that rotation of the sprocket imparts rotation to the shaft.

The shafts 37 and 38 are provided with identical sprockets 42 over which the chains 32 are reeved.

Likewise supported upon the rails 34 and 36 are brackets 43 which provide side walls 44 to the conveyor 12, thereby providing safety walls so that an operator's fingers will not be caught between the advancing cups 26. In addition the brackets 43 support members 46 which extend outwardly under the brackets 28 serving to support the same and forming rails upon which the cups 26 ride. In this manner the upper run of the conveyor 12, which is composed of a plurality of cups 26 supported upon the chains 32, is supported and prevented from sagging during operation. By preventing the upper run of the conveyor 12 from sagging, the same is maintained in a proper spaced relationship with respect to the feed hopper 11 and wear and strain upon the chains 32, bushings 39, etc. is reduced to a minimum.

From the foregoing it will be obvious that I have provided a conveyor 12 which is formed of a plurality of cups 26 which are mounted upon chains 32. The cups 26 present a series of staggered recesses 27 which are adapted to receive walnuts, pecans and other items from the feed hopper 11 as the upper run of the conveyor 12 passes beneath the open lower end 23 of the hopper 11. The entire conveyor member 12 is supported by the rails 34 and 36 and the shafts 37 and 38. The shaft 37, being the driven shaft, by virtue of its also providing a mounting for the sprocket 41 will, through the sprockets 42, likewise advance the chains 32. The upper shaft 38, being an idler shaft, serves to support the upper end of the conveyor 12. As the cups 26 on the upper run of the conveyor 12 advance, they will turn about the axis of the idler shaft 38 and will discharge their contents as they turn. By virtue of their staggered relationship as shown in Figure 3 the contents of the various recesses 27 will be discharged in a staggered relationship since each cup 26 advances about the axis of the shaft 38 just ahead of and just behind another cup 26 but never parallel to another cup 26. Therefore, only one walnut, pecan, or other item in the conveyor 12 will at a given time be discharged over the upper end of the conveyor 12. It will be obvious, therefore, that the rate of discharge will depend on the speed of advance of the upper run of the conveyor 12. In other words, if the speed of the upper run of the conveyor 12 is great, the cups 26 will turn about the axis of the shaft 38 with great rapidity with the result that the contents of the cup will likewise be discharged rapidly and the time interval between the discharge of each of the cups 26 will be small. On the other hand, if the upper run of the conveyor 12 is caused to advance slowly the contents from the cups 26 will likewise be discharged slowly or, in other words, there will be a greater interval of time between discharge of the various cups 26.

The walnuts, almonds or pecans or other items which are conveyed by the conveyor 12 and which are discharged from the cups 26 over the upper end of the conveyor 12 are discharged into a weighing mechanism 13.

The weighing mechanism 13 is likewise mounted upon the base 10 and, as shown herein, is to some extent supported upon an auxiliary base 47 which is carried by the vertical supports 19. The weighing mechanism is carried by a pair of vertical brackets 48 as shown. The brackets 48 provide a mounting for a cross-shaft 49 and a rigid cross-member 51. Rotatably mounted upon the shaft 49 are a pair of arms 52 and 53. The ends of the arms 52 and 53 remote from the shaft 49 are rotatably secured to a vertical wall member 54 as by means of the pintle and gudgeon arrangements 56. The shafts 57 are coaxially aligned and are parallel to the longitudinal axis of the shaft 49.

The cross member 51 is provided with a depending member 58 to the lower end of which there is pivotally mounted at 59 a beam 61. As shown in Figure 1, one end of the beam 61 is mounted by means of a pintle and gudgeon arrangement 62 to the vertical wall member 54. The axes of the shafts 57 and 63 are parallel to the axis of the shaft 59. The distance between the longitudinal axis of the shaft 49 and the longitudinal axes of the shafts 57 is identical to the distance between the longitudinal axis of the shaft 59 and the longitudinal axis of the shaft 63. Likewise the distance between the longitudinal axis of the shaft 49 and the longitudinal axis of the shaft 59 is identical to the distance between the longitudinal axes of the shafts 57 and the axis of the shaft 63. Thus a parallelogram arrangement is formed by the members 52 and 53, the member 54 and the beam 61, and since the axes of the shafts 49 and 59 are positioned in one vertical plane, it is obvious that the wall member 54 will at all times, likewise be in a vertical plane.

The upper end of the member 54 supports a hopper 64 into which the walnuts, pecans or other items which are conveyed by the conveyor 12 will be discharged from the cups 26.

The lower end of the member 54 is provided with a platform 66 which has a dual purpose. The first purpose of the platform 66 is to provide a support for a sack or bag or other container 67. The second purpose of the platform 66 is to provide an upper mounting and recess 68 to receive the upper end of a spring 69, whose lower end is mounted in a receptacle 71 mounted upon the auxiliary plate 47. The purpose of the spring 69 is to prevent too rapid movement of the hopper 64 and platform 66. By changing spring 69 one may vary the amount of weight required upon the platform 66 to lower the same.

The beam 61 is provided with a pair of members 72 and 73 which rotatably support the end of a lead screw 74. A weight 76 is mounted upon the lead screw 74 and, by suitable operation of the lead screw 74 the weight 76 may be moved from one end of the lead screw 74 to the other, depending upon the wishes of the operator. In addition, the beam 61 is provided with a pin 77 upon which a balance weight 78 may be hung. The balance weight may likewise be changed by the operator in order to vary the amount of weight required upon the platform 66 to lower the same.

The arms 52 and 53 are provided with a pair of extensions 79 which are adapted to receive threaded screws 81. The screws 81 are provided with lock nuts 82 whereby, once the screws 81 have been positioned as an operator may desire, they will not be turned out of position when the lock nuts 82 are turned down in a manner well-known to mechanics.

The rigid member 51, in addition to providing a mounting for the member 58, is also provided with a pair of extending arms 83 and 84. The arms 83 and 84 respectively form a support for a pair of electric switches 86 and 87 respectively. The switches 86 and 87 will hereinafter be referred to as the "low speed switch" and "neutral switch" respectively. The switches 86 and 87 are provided with actuating levers 88 and 89 respectively which are adapted to be actuated by the extensions 79 on the arms 52 and 53. In other words, when the arm 52, for example, pivots about the axis of the shaft 49, the extension 79 on the arm 52 will likewise be actuated. When the arm 52 is actuated in such a manner that the extension 79, through the screw 81, engages the actuating lever 88, the switch 86 will likewise be operated. Likewise movement of the arm 53, will, through its extension 79 actuate the lever 89 and operate the neutral switch 87.

Thus it will be seen that the actuation or movement of the weighing mechanism 13 will control the switches 86 and 87. For example, when a quantity of walnuts, pecans or other items being weighed is received by the weighing mechanism 13, either in the hopper 64 or in a sack, bag or other receptacle 67 upon the base 66, the weight of these items will actuate the weighing mechanism 13. Movement of the member 54 will be resisted by the spring 69 and by the weights 76 and 78. However, depending upon the resistance offered by the spring 69 and the effect of the weights 76 and 78, weight upon the platform 66 will serve to urge the same downwardly thereby, through the parallelogram arrangment created by the arms 52 and 53, the member 54 and the beam 61, actuating one or both of the switches 86 and 87.

The drive mechanism 14 serves to drive the conveyor through the sprocket 41. The sprocket 41 is connected to the drive mechanism 14 through a chain 91.

The power source for the drive mechanism 14 consists of an electric motor 92 which drives a shaft 93 which is mounted in suitable bearings 94. The shaft 93 is provided with a worm gear 96 which meshes with a gear 97 which is suitably mounted upon and drives a shaft 98. The shaft 98 is also provided with and adapted to drive a pair of gears 101 and 102 which, as is shown, are of different diameters. The gears 101 and 102 are in constant mesh with a pair of gears 103 and 104 which are rotatably mounted upon a shaft 106. Hereafter the gears 101 and 103 will be referred to as the "low speed gears" and the gears 102 and 104 as the "high speed gears." Also mounted upon and adapted to be driven by the shaft 106 I have provided a sprocket 107 over which is reeved the chain 91. Rotation of the sprocket 107 will, through the chain 91, cause rotation of the sprocket 41 and operation of the conveyor 12.

Also mounted upon the shaft 106 and splined thereto and adapted to drive the shaft 106, is a dog clutch 108. The jaws of the dog clutch 108 are adapted to engage or disengage cooperating jaws upon the gears 103 and 104 which, it will be recalled, are rotatably mounted upon the shaft 106. The dog clutch 108 is actuated by a lever 109 and a yoke 111 which serves as a mounting for pins 112 which engage the annular groove 113 in the clutch 108. In this manner the lever 109 through the yoke 111 and pins 112 will actuate the clutch 108 either to the right or to the left as shown in Figures 2 and 5. For example, when the lever 109 moves the clutch 108 down from the position shown in Figure 2, the jaws of the clutch 108 are engaged with cooperating jaws upon the gear 103. Since the gear 103 is rotating, the clutch 108 will likewise rotate. Since the clutch 108 is splined to the shaft 106, the shaft 106 will likewise be caused to rotate, as will the sprocket 107. On the other hand, if the lever 109 moves the clutch 108 up from the position shown in Figure 2 the jaws of the clutch 108 will engage the jaws of the gear 104 whereupon the gear 104 which is rotating will, through the clutch 108 which is splined to the shaft 106, drive the sprocket 107. When the lever 109 is in the position shown in Figure 2, which will be referred to as the "neutral position," the jaws of the clutch 108 are disengaged from the jaws on both the gears 103 and 104 whereby the gears 103 and 104 will be free to rotate about the shaft 106 and will not impart movement thereto. In this condition the sprocket 107 is motionless and the conveyor 12 will not be driven.

The means for actuating the lever 109 consists of a pair of reciprocating shafts 116 and 117 which are journaled for reciprocating movement within the walls 118. Since the lever 109 is mounted upon each of the shafts 116 and 117 in an identical manner it will be sufficient to describe the manner in which it is mounted upon shaft 116, for example. The lever 109 is provided with an orifice, not shown, through which the shaft 116 extends. On either side of the lever 109 and spaced a slight distance therefrom I have provided a pair of blocks 119 and 121 which are secured to the shaft 116 in any suitable manner, as, for example, by means of pivot pins 122. Since there is a slight space between the blocks 119 and 121 and the lever 109 the same may be said to be loosely mounted thereon.

Also mounted upon the shafts 116 and 117 between the blocks 121 and the wall 118 I have provided a pair of springs 123, one end of each of said springs abutting the wall 118 and the other end abutting the member 121. As shown in Figure 2, both springs 123 are compressed and tend to urge both the members 121 up, as shown in Figure 2. The shafts 116 and 117 are pivotally connected to solenoids 124 and 126 respectively. The solenoids 124 and 126 are mounted upon a flanged member 127, as shown, which in turn is secured to the wall 118. For the purposes of further description herein solenoid 124 will be referred to as the "low speed solenoid" and the solenoid 126 will be referred to as the "neutral solenoid."

In Figure 2 it will be apparent that both solenoids 124 and 126 are energized and, when this situation exists both shafts 116 and 117 have been moved to a limiting position, as shown in Figure 2, against the action of springs 123.

I have also provided a threaded member 128 which is threadably mounted in the wall 118. The distance which the member 128 projects from wall 118 toward the lever 109, as shown in Figure 2, may be varied. The purpose of threaded member 128 will more fully hereinafter be disclosed.

As has been previously pointed out, in Figure 2 the low speed solenoid 124 and the neutral solenoid 126 are illustrated as being energized with the result that the shaft 109 may be said to be in neutral position. This is for the reason that the shaft 109 has moved the clutch 108 to a position at which it does not engage either of the gears 103 and 104 and no rotary motion is being imparted to the shaft 106.

When the low speed solenoid 124 and the neutral solenoid 126 are de-energized, the effect of springs 123 upon the shafts 116 and 117 will be apparent. Both of these shafts will be forced upwardly from the position shown in Figure 2, until the lever 109 abuts against the member 128. Obviously, and as is shown in Figure 6, the lever 109 will actuate the clutch 108 on the shaft 106 to a position at which it engages the high speed gear 104. It will be recalled that the high speed gear 104 is constantly rotating and, therefore, since the clutch 108 is splined upon the shaft 106, the shaft 106 and the sprocket 107 will be rotated and the chain 91 will be driven. An examination of Figure 2 will reveal that the gear 102 and the gear 104 are of approximately the same diameter and are continually in mesh. This results in a substantially direct drive between the shaft 98 and the shaft 106.

When the low speed solenoid 124 is energized and the neutral solenoid 126 is not energized, the spring 123 on the shaft 117 will hold the end of the lever 109 against the stop 128. However, energization of the low speed solenoid 124 will overcome the effect of the spring 123 on the shaft 116 and will pivot the lever 109 about the end of the threaded member 128 and disengage the clutch 108 from the gear 104. Clutch 108 will engage gear 103, which it will be recalled, has previously been referred to as the low speed gear. A study of Figure 2 will indicate that the gear 101 is of substantially less diameter than the gear 103 whereby a gear reduction will take place upon the rotation of the gear 101. Since both the gears 101 and 102 are driven from the same shaft, it will be obvious that gear 103 will be driven at a greatly reduced speed with respect to the gear 104. Therefore, upon the movement of clutch 108 to a position at which it disengages the gear 104 and engages gear 103, rotary motion of the gear 103 will be imparted at a reduced speed to the shaft 106 and the sprocket 107. Consequently, when the clutch 108 engages the low speed gear 103 the chain 91 will likewise be driven at a reduced speed.

When the low speed solenoid 124 is energized as has previously been described in connection with the low speed operation of this device, and the neutral solenoid 126 is energized, it is obvious that the effect of spring 123 upon the shaft 117 will have been overcome and that the shaft 117 will be moved to the position shown in Figure 2. When this occurs the lever 109 is pivoted with respect to the shaft 116 whereupon the clutch 108 is disengaged from the gear 103. When this occurs the clutch 108 is disengaged from both the low speed gear 103 and the high speed gear 104 whereupon both of said gears continue to rotate freely upon the shaft 106 without imparting any rotary motion thereto. Thus, in the neutral position, there is no rotation of the shaft 106 and sprocket 107 and there is no drive to the remainder of the device through the chain 91.

From the foregoing it will be seen that I have provided a simple solenoid control for the operation or change of speed of the sprocket 107. By selectively energizing or de-energizing either or both the low speed solenoid 124 and the neutral solenoid 126, one may operate the device at high speed, may operate the device at low speed, or may cause the device to stop by returning the clutch 108 to the so-called neutral position as shown in Figure 2.

The control circuit 16 for controlling the operation of this device is shown in Figure 2.

The circuit 16 is connected to a suitable source of outside current labeled "input." A control switch 131 is introduced into the circuit which supplies electric current to the low speed switch 86 and the neutral switch 87. Low speed switch 86 is connected to the low speed solenoid 124. Neutral switch 87 is connected to the neutral solenoid 126. Both solenoids are further connected to the input line as shown. In addition, I have provided a holding switch 132 which is actuated by the neutral solenoid 126, so that when the neutral solenoid 126 is actuated and in the position shown in Figure 2, the holding switch is closed and both the low speed solenoid 124 and the neutral solenoid 126 are energized regardless of the further operation of the low speed switch 86 or the neutral switch 87.

The circuit may further be described as follows: When the control switch 131 is closed and when the low speed switch 86 and the neutral switch 87 are closed, both the low speed solenoid 124 and the neutral solenoid 126 are energized. The effect of energization of both the low speed solenoid 124 and neutral solenoid 126 has previously been explained as returning the lever 109 to the neutral position shown in Figure 2. When the control switch 131 is opened, the previously described circuit is opened with the result that the low speed solenoid 124 and the neutral solenoid 126 are de-energized and the springs 123 operate to urge the lever 109 to the position shown in Figure 6 in which position, it will be recalled, the clutch 108 engages the high speed gear 104 and causes the shaft 106 and sprocket 107 to operate at the highest speed attainable with this device. Furthermore, the holding switch 132 is opened.

When the low speed switch 86 is closed by the operation of the weighing mechanism 13, in a manner presently to be described, the low speed solenoid is energized. Energization of the low speed solenoid 124 serves to overcome the effect of spring 123 on the shaft 116 and actuates the lever 109 as shown in Figure 5, in which position the clutch 108 is disengaged from high speed gear 104 and is caused to engage the low speed gear 103. As has previously been pointed out, when the clutch 108 and the low speed gear 103 are in engagement, the sprocket 107 is caused to rotate at a reduced speed.

When the neutral switch 87 is actuated by the weighing mechanism 13 in a manner presently to be more fully described, the circuit is closed through said neutral switch 87 to the neutral solenoid 126 thereby energizing the same. The effect of energizing the neutral solenoid 126 will be to overcome the effect of spring 123 on the shaft 117 and to actuate the lever 109 to the position generally shown in Figure 2 which, it will be recalled, is the so-called neutral position.

Operation of the neutral solenoid 126 serves to close the holding switch 132 thereby insuring, until the switch 131 is further actuated, that both the low speed solenoid 124 and the neutral solenoid 126 will remain energized regardless of any actuation of the weighing mechanism 13 with resultant opening or closing of the low speed switch 86 or the neutral switch 87.

Opening of the switch 131 will de-energize the entire circuit previously described with the result that there will be no flow of current through the holding switch 132 to the low speed solenoid 124 and neutral solenoid 126. In addition, there will be no current to the low speed switch 86 and the neutral switch 87. It must be borne in mind that the control switch 131 is normally closed in which position the solenoids 124 and 126 are energized and the device operates in neutral position. It is only upon the opening of the switch 131 that the circuit previously described is broken and that the solenoids 124 and 126 are de-energized. Since the control switch 131 is normally closed, it is obvious that by operation of the same I mean merely that the circuit is broken for an instant and that after the circuit has been broken, the switch 131 is returned to normally closed position whereby energy is supplied to the low speed switch 86 and the neutral switch 87 to be further transmitted through those switches when the same are closed.

Operation of the entire device may briefly be described as follows: The control circuit 16 is connected at "input" to a suitable source of current. In addition, current is introduced to the motor 92 and the same is caused to operate.

A quantity of walnuts, pecans or other items to be weighed and sacked is further introduced into the feed hopper 11 in any quantity to be desired.

Let it be assumed that it is desired that nuts are to be weighed in one pound quantities. In the event that a pound of walnuts, pecans or other items is to be delivered into each of the containers 67 upon the platform 66, the spring 69 will be rather light and its principal purpose will be to prevent too rapid downward swinging movement of the platform 66. In addition, as the walnuts, pecans or other items are discharged from the upper end of the conveyor 12 it will be apparent that they will fall a considerable distance before they reach the container 67. The effect of the spring will be to partially overcome the effect of this drop. The weight 78 will be selected to provide a counterbalance to overcome the weight of the hopper 64, the vertical member 54 and the platform 66, together with, for example, most of the weight of the filled package 67. By adjustment of the lead screw 74 the weight 76 may be moved along the beam 61 to provide a further and more accurate balance.

Continuing to assume that it is desired that the receptacle 67 be packed with 16 ounces of walnuts, pecans or other items, the screws 81 are positioned to actuate the low speed switch 86 and the neutral switch 87 in the following manner: As the contents of the receptacle 67 approach 15 ounces, for example, I intend that the discharge from the conveyor 12 be slowed down. To secure operation of this device in this manner, the screw 81 in the extension 79 on the arm 52 will be set to close the low speed switch 86 when the contents of the receptacle 67 weigh 15 ounces. Closing the low speed switch 86 in this manner will, as has previously been pointed out, cause the clutch 108 to be disengaged from the high speed gear 104 and to engage the low speed gear 103 whereupon the speed of the conveyor 12 will be reduced. As the speed of the conveyor 12 is reduced the rate of discharge from the cups 26 will likewise be reduced. As the contents of the cups 26 are introduced into the package at reduced speed the package 67 will naturally tend to be filled more slowly.

It is my further desire that when the contents of the package reach a full pound, no more walnuts or other items be discharged therein. To secure this result the screw 81 upon the extension 79 of the arm 53 is adjusted so that when the contents of the package 67 weigh one pound the lever 89 of the neutral switch 87 will be actuated to close the switch 87 and energize the low speed solenoid 124. When the neutral solenoid 126 is energized (since the low speed solenoid 124 has previously been energized) the lever 109 will be shifted to neutral position whereupon the sprocket 107 will cease to rotate.

When the spring 69, weight 76 and weight 78 have been adjusted as above indicated, and when the members 81 have been set to close the switches 86 and 87 as has previously been described, the device may be said to be in operating condition.

Operation of this device after the foregoing adjustments have been made may be described as follows: Current is supplied to the motor 92 with the result that the worm gear 96, gear 97 and the gears 101 and 103 and gears 102 and 104 are constantly rotating.

A supply of walnuts, pecans or other items is then introduced into the hopper 11. A suitable container 67 is placed upon the platform 66.

The control switch 131 which, it will be recalled, is normally closed is then opened with the result that the low speed solenoid 124 and the neutral solenoid 126 are de-energized. De-energization of the neutral solenoid 126 also causes the holding switch 132 to open.

As has previously been explained de-energization of the solenoids 124 and 126 allows the springs 123 to move the lever 109 upwardly to the high speed position with the result that the clutch 108 engages the constantly rotating high speed gear 104. Since the clutch 108 is splined to the shaft 106, rotation of the high speed gear 104 will ultimately cause high speed rotation of the sprocket 107 which, through the chain 91, drives the sprocket 41. Rotation of the sprocket 41 will, through the sprockets 42, advance the chains 32 and cups 26, and cause the same to pass under the open end of the feed hopper 11. As the cups 26 pass under the open end of the hopper 11, the contents of the hopper will be received in the recesses 27 and will be carried, as shown in Figure 1, upwardly and over the upper end of the conveyor 12 and will be discharged through the hopper 64 into the container 67. As the discharged items accumulate in the container 67, the platform 66 will be depressed. As has previously been explained, too rapid downward movement of the platform 66 is prevented by the spring 69. The effect of the counterbalances 76 and 78 will, likewise, tend to prevent too rapid swinging of the platform 66. As the contents of the container 67 approach a predetermined weight as, for example, 15 ounces, the low speed switch 86 will be actuated and will supply current to the low speed solenoid 124. When this occurs, it will be recalled, the low speed solenoid 124 overcomes the effect of the spring 123 on the shaft 116 and shifts the clutch 108 from the position at which it engages the high speed gear 104, to a position at which it engages the low speed gear 103. This shift reduces the speed of rotation of the sprocket 107 and results in a decrease in the speed of the conveyor 12. As the contents of the cups 26 are discharged more slowly over the end of the conveyor 12 it will be appreciated that greater accuracy may be attained. In other words, there is sufficient time between the time one walnut reaches the receptacle 67 for a distinct weighing operation to be carried on before another walnut is discharged from the following cup 26. In this manner each of the last few nuts or other items discharged by the conveyor 12 is, in effect, separately weighed. When sufficient walnuts, pecans or other items have been introduced into the receptacle 67 to bring the weight of the same to, for example, 16 ounces, the platform 66 has been lowered and the screw 81 on the arm 53 has actuated the lever 89 of the neutral switch 87, closing the switch 87 and energizing the neutral solenoid 126.

As has previously been explained (since the low speed solenoid 124 has already been energized) energization of the neutral solenoid 126 will result in the clutch 108 being returned to neutral position with the result that the entire mechanism stops.

Bag 67 and its contents may then be removed from the platform 66. The platform 66 and the hopper 64 will then swing upwardly under the pressure of the spring 69 and by virtue of the effect of the weights 76 and 78. When the platform 66 swings upwardly the switches 86 and 87 will be opened. However, the opening of the switches 86 and 87 does not serve to de-energize the solenoids 124 and 126 because, as has previously been explained, the holding switch 132 is actuated by the neutral solenoid 126 whereby, for as long a time as the neutral solenoid 126 is energized, the holding switch 132 will be closed, thereby energizing both the solenoids 124 and 126. The holding switch 132 will only be opened when the neutral solenoid 126 is de-energized. The neutral solenoid 126 will only be de-energized when the control switch 131 is opened for the brief instant which starts the entire cycle of operation.

Another bag or receptacle is then placed upon the platform. Control switch 131 is opened. As has previously been explained, this results in a de-energizing of the two solenoids 124 and 126 with the result that the drive mechanism is actuated at high speed. The complete cycle is again repeated until the contents of a new bag 67 approach 15 ounces. When this occurs, the drive mechanism is shifted to low speed and the items to be weighed and sacked are more or less individually dropped or dribbled into the container 67. When the contents of the container 67 approach the desired total weight as, for example, 16 ounces, the neutral solenoid 126 will be actuated thereby shifting the clutch 108 to neutral position and closing the holding switch 132. The conveyor mechanism 12 will be halted and the container 67 and its contents may then be removed from the platform 66.

Figure 7 illustrates a modification of the weighing mechanism previously described. I have found that in the weighing of some items which are rather heavy, the spring 69 and the weights 76 and 78 may not control the platform 66 sufficiently accurately. In other words, when the objects being discharged over the end of the conveyor 12 are rather heavy, the sudden addition of this weight to the accumulated items within the receptacle 67 will cause sufficient movement of the platform 66 to actuate one or both of the switches 86 and 87, before the weight of the items within the receptacle 67 actually reaches the weight for which the switches 86 and 87 have previously been set.

To overcome this difficulty I have provided a resilient rubber member 133, the lower lip 134 of which is in close proximity to the upper edges of the cups 26. Member 133 prevents any of the walnuts, pecans or other items from being discharged from the cups 26 until the cups have swung about the axis of the shaft 38 sufficiently to have cleared the lower end 134 from the member 133. Member 133 may be supported in any suitable manner as, for example, by a pair of arms 136 which are secured to the side rails 34 of the conveyor mechanism 12.

As shown in Figure 7, the hopper 64 which is mounted upon the vertical member 54 is provided at its lower open end with a swinging gate 137. The gate 137 is provided with an operating arm 138 and is normally held in closed position by spring 139. The remainder of the device operates in the same manner as the preferred embodiment shown in Figures 1 to 6 hereof, as previously described herein. However, the material discharged over the end of the conveyor 12 is not discharged through the hopper 64 into a receptacle, sack, bag, etc., 67, but is retained within the hopper 64 by gate 137. When the contents of the hopper 64 approach 15 ounces, for example, the mechanism is shifted from high speed to low speed and, when the contents of the hopper 64 reach the limit of one pound, the entire mechanism is stopped.

When the operator sees that the machine is stopped, he or she slips a bag 67 over the lower end of the hopper 64. In so doing she will engage the lever 138 and swing the same about the hinge 141 against the tension of the spring 139. The contents of the hopper 64 will then be discharged into the sack 67. The hopper 64 then returns to an elevated position as has previously been described in connection with the preferred embodiment herein and the machine is started by the operation of the control switch 131. The machine continues to operate in a manner as has previously been described until the contents of the hopper 64 again reach the predetermined weights as has previously been described.

In this manner I have provided an absolute means for preventing inaccuracy which may be created by the effect of too great a weight being discharged suddenly from the conveyor mechanism into the receptacle 67.

Another modification of my device is illustrated in Figure 8 and has for its purpose another method of overcoming the difficulties previously mentioned. In this modification the hopper 64 is likewise provided with a swinging grate 137a which in turn may be actuated by a lever 138a about the hinge 141a. In this event, however, the member 138a is adapted to be actuated by a solenoid 142 which is also mounted upon the hopper 64. The plunger 143 of the solenoid 142 is secured to the lever 138a by a connecting link 144.

The lower end of the hopper 64 is adapted to drop downwardly into the area within a second hopper 146 which is rigidly secured to the vertical support members 19 by a pair of supporting arms 147. The hopper 146 is provided with a switch 148 which, as is shown in Figure 8, is connected to and adapted to operate the solenoid 142. The switch 148 and the solenoid 142 are connected to a suitable source of current, not shown.

Operation of the device illustrated in this modification is similar to the operation of the device as illustrated in Figure 7, in that the walnuts, pecans, or other items are retained within the hopper 64 by virtue of the gate 137a. The gate 137a is normally held in closed position by the action of the spring 139a. However, the gate 137a can be opened against the resistance spring 139a by actuating the lever 138a.

When the contents of the hopper 64 weigh enough to stop the operation of the machine, the operator then slips a receptacle or sack 67 over the lower hopper 146. The operator then operates the switch 148 and energizes the solenoid 142. By energizing the solenoid 142 the resistance of the spring 139a is overcome and the gate 137a is opened whereupon the contents of the hopper 64 are free to pass through the hopper 146 into the sack 67. When the sack 67 is removed from the hopper 146 the operator removes his thumb from the switch 148 thereby de-energizing the solenoid 142. When the solenoid 142 is de-energized the spring 139a serves to close the lower end of the hopper 64. The machine is then started, as has previously been described, by the operation of the control switch 131, whereupon the conveyor 12 is again started and walnuts, pecans, etc. are introduced over the end of the conveyor 12 into the hopper 64.

As shown particularly in Figure 9, I have provided four curved members 151, each of which is adapted to overlie one of the advancing rows of cups 26. The curved portion of the members 151 is substantially concentric with the upper sprocket 42 over which the chains 32 are reeved. In this manner the members 151 serve to retain walnuts, pecans or other similar items in the cups 26 until the cups have advanced over the upper end of the conveyor mechanism 12 and around the sprocket 42 sufficiently to clear the lower ends of the devices 151. The devices 151 are rotatably mounted upon a shaft 152 which in turn is mounted upon a pair of members 153 secured to the frame 33. The springs 154 are adapted to urge the members 151 into close engagement with the upper surface of the conveyor 12.

The effect of the members 151 is substantially the effect provided by the device 133 as previously illustrated in Figure 1 and described in connection therewith.

The receiving hopper 156 as illustrated in Figures 9 and 10 performs the same function as the receiving hopper 146 illustrated in Figure 8 and described herein. Hopper 156 is supported by a pair of brackets 157 which, in turn, are secured to the member 54. As shown in Figures 9 and 10, the hopper 156 is provided with an open bottom which may be closed by a pair of swinging gates 158 and 159. The arms 161 and 162 which support the gates 158 and 159 respectively are pivotally mounted upon the side walls of the hopper 156. It is obvious that when the gates 158 and 159 are in the closed position as shown in Figure 10, the hopper 156 will likewise be closed and any walnuts, pecans or other items discharged into the same will be retained therein. However, when the gates 158 and 159 are swung open the contents of the hopper 156 are discharged into a second hopper 163.

Means for opening and closing the gates 158 and 159 consists of a solenoid 164 which is mounted upon one of the supports 19. The operating member of the solenoid 164 is pivotally connected to one end of a rod 166, the other end of which is secured to one end of a rack 167. The other end of the rack 167 is secured to a spring 168, the normal tension of which serves to draw the rack 167 to the right as shown in Figure 11.

The rack 167 is thus adapted to be operated by the solenoid 164 and movement of the same will, through the arm 162, serve to open or close the gate 159. The rack 167 is constantly in mesh with a gear 171 whose axis of rotation is fixed with respect to the hopper 156. The gear 171 is likewise continually in mesh with a second rack 172 which is operatively secured to the arm 161 as shown. It is obvious, therefore, that when the rack 167 is moved to the right, as shown in Figure 11, that the gear 171 will be rotated in a counterclockwise direction, thereby moving the rack 172 to the left as shown in Figure 11. In this manner both the gates 158 and 159 will be moved from the position shown in Figure 10 to open position.

A hopper 163 is mounted immediately below the hopper 156 and is adapted to receive anything discharged from the hopper 156 by the opening of the gates 158 and 159. The hopper 163 is supported by the vertical members 19. The lower end of the hopper 163 is open and a sack, bag or other receptacle 67 may be placed over the opening or end of the hopper 163 to receive the contents therefrom. The hopper 163 is, in effect, really a funnel to direct the discharged contents of the hopper 156 into the bag or sack 67.

Near the lower end of the hopper 163 and in a position to be actuated by an operator when the operator places the bag, sack or other receptacle 67 over the open lower end of the hopper 163 there is a lever 173. The lever 173 is adapted to actuate a switch 174 which in turn is connected to the solenoid 164 and adapted to energize the same.

As illustrated in Figures 9 and 10, I have substituted a dash pot arrangement 176 for the spring 69. The dash pot 176 is secured to the horizontal base 17. This device is of the customary type and consists of an open ended cylinder 177 within which a piston 178 is adapted to be actuated. The piston 178 is connected to the member 54 by a suitable connecting rod 179.

Operation of the modifications illustrated in Figures 9, 10 and 11 may briefly be described as follows: The conveyor 12 is actuated and the walnuts, pecans or other items within the cups 26 are advanced upwardly over the end of the same as has previously been described. Members 151 which overlie the advancing cups 26 prevent the items within the cups 26 from being discharged from the conveyor 12 until the items and the cups 26 conveying them have advanced beyond the lower extreme end of the member 151. As has previously been explained, this insures a time interval between the discharge of successive items from the conveyor 12. Therefore, there is an interval of time between successive additions to the accumulation of walnuts, pecans, or other items in the hopper 156.

Movement of the member 54 is caused by the weight within the hopper 156. Likewise, movement of the hopper 156 serves to control the flow of electric current to the low speed and the neutral solenoids as has previously been described herein, with the result that a predetermined weight of items may be allowed to accumulate within the hopper 156 before the low speed solenoid 124 is actuated. As has previously been explained, this results in a decrease in the speed of the conveyor 12, with the result that a greater period of time elapses between a deposit of successive items within the hopper 156. In this manner it may be said that each of the last few items discharged from the conveyor 12 into the hopper 156 is weighed separately.

When the accumulated weight within the hopper 156 reaches a predetermined weight, the neutral solenoid 126 will be actuated with the result that conveyor 12 will be stopped. When the machine has stopped, the operator will then place a sack or other receptacle 67 over the lower open end of the hopper 163. The operator then actuates the lever 173 and closes the switch 174 with the result that the solenoid 164 is energized. Energization of the solenoid 164 will move the rack 167 to the right as shown in Figure 11. This results in the opening of the gate 159. The movement of the rack 167 against the tension of spring 168 also causes the rack 172 to move to the left with the result that the gate 158 is opened. As the gates 158 and 159 are opened the contents of the hopper 156 may be discharge into and through a hopper or funnel 163.

When the bag, sack or other receptacle 67 is removed from the open end of the hopper or funnel 163 the operator likewise releases the lever 173 with the result that the switch 174 is opened. This results in de-energization of the solenoid 164. The spring 168 then returns the rack 167 to the left, as shown in Figure 11 with the result that the gate 159 is closed and the rack 172 is moved to the right, as shown in Figure 11, resulting in a closing of the gate 158.

The operator then opens the control switch 131. As has previously been described, this will cause the conveyor 12 to be operated at high speed and will cause walnuts, pecans or other items to be discharged over the upper end of the conveyor 12 into the hopper 156.

The modification shown in Figure 12 illustrates a modified manner of feeding walnuts, pecans or other items to the conveyor 12. The lower sprocket 42 is enlarged but serves the same general purpose, that is, to drive the conveyor 12. The feed hopper 11 is of a different design and is placed near the lower end of the conveyor 12 generally as shown. The lower wall 181 of the feed hopper 11 slopes slightly and terminates immediately adjacent the upper surface of the conveyor 12, and, as shown, is slightly inclined whereby the contents of the hopper naturally go to the lowest point therein. The wall 182 of the hopper 11 is similar to the wall of the feed hopper, previously described herein, and, like that wall, is provided with a resilient member 183 which is substantially identical to and serves the same general purpose as the member 24 previously described herein.

In the feed hopper 11 as shown in Figure 12, the contents of the hopper will be urged against the cups 26 of the conveyor 12 which are being advanced upwardly over the sprocket 42. It will be seen that the walnuts, pecans or other items in the hopper 11 will not be lifted onto the conveyor 12 from their position adjacent the wall 181 unless they are actually carried within one of the recesses 27 in the cups 26.

I claim:

In a weighing machine, a flexible endless conveyor having means thereon defining a plurality of individual article receiving cups, said cups being arranged in rows generally transversely of said conveyor with the rearmost cup of each row positioned in advance of the foremost cup of the next succeeding row, each of said cups being separately attached to said conveyor at a position longitudinally spaced from every other cup, means arranged to deposit an article in each cup of an upper run of said conveyor, means for selectively driving said conveyor at different speeds, means guiding said conveyor around an idler shaft at a relatively short radius, the longitudinal spacing of said cups and the magnitude of said radius being so related that said cups are individually and sequentially tilted to dumping position whereby to deliver individual articles as said conveyor moves around said idler shaft, a weighing mechanism having a receiver positioned for receiving articles dumped from said cups, means actuated by said weighing mechanism to control said driving means to effect driving said conveyor at a high speed until a first predetermined weight of articles is deposited in said receiver, to then effect driving said conveyor at a low speed to successively and intermittently deposit individual articles in said receiver, and to then stop said conveyor after a final predetermined weight of articles is in said receiver.

HARRY L. GIBSON.

References Cited in the file of this patent

UNITED STATES PATENTS

| Number | Name | Date |
|---|---|---|
| 579,445 | Richards | Mar. 23, 1897 |
| 607,478 | Richards | July 19, 1898 |
| 806,934 | Lawrence | Dec. 12, 1905 |
| 1,354,975 | Hurst | Oct. 5, 1920 |
| 1,994,797 | Thomas | Mar. 19, 1935 |
| 2,226,236 | Bleam | Dec. 24, 1940 |
| 2,296,490 | Ashlock | Sept. 22, 1942 |
| 2,303,140 | Sackett | Nov. 24, 1942 |
| 2,308,038 | Ashlock | Jan. 12, 1943 |
| 2,338,148 | Walker | Jan. 4, 1944 |
| 2,451,534 | Christensen | Oct. 19, 1948 |
| 2,464,545 | Ahlburg | Mar. 15, 1949 |
| 2,502,380 | Howard | Mar. 28, 1950 |
| 2,603,443 | Miller | July 15, 1952 |
| 2,634,085 | Allen | Apr. 7, 1953 |